United States Patent
Bogenrieder

(10) Patent No.: US 12,246,667 B2
(45) Date of Patent: Mar. 11, 2025

(54) METHOD FOR DYNAMICALLY RESTRAINING AN OCCUPANT FASTENED INTO A VEHICLE SEAT WITH A SEATBELT

(71) Applicant: Mercedes-Benz Group AG, Stuttgart (DE)

(72) Inventor: Ralf Bogenrieder, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 151 days.

(21) Appl. No.: 18/250,889

(22) PCT Filed: Oct. 22, 2021

(86) PCT No.: PCT/EP2021/079320
§ 371 (c)(1),
(2) Date: Apr. 27, 2023

(87) PCT Pub. No.: WO2022/090074
PCT Pub. Date: May 5, 2022

(65) Prior Publication Data
US 2023/0406248 A1     Dec. 21, 2023

(30) Foreign Application Priority Data
Oct. 28, 2020 (DE) .................... 10 2020 006 623.2

(51) Int. Cl.
*B60R 22/34* (2006.01)
*B60R 21/0132* (2006.01)
*B60R 21/01* (2006.01)

(52) U.S. Cl.
CPC ............. *B60R 21/0132* (2013.01); *B60R 2021/01272* (2013.01); *B60R 22/34* (2013.01)

(58) Field of Classification Search
CPC ............. B60R 21/0132; B60R 22/34; B60R 2021/01272
See application file for complete search history.

(56) References Cited

U.S. PATENT DOCUMENTS

2007/0102915 A1    5/2007  Odate

FOREIGN PATENT DOCUMENTS

| CN | 201941834 U | 8/2011 |
| DE | 10 2008 050 316 A1 | 5/2010 |

(Continued)

OTHER PUBLICATIONS

PCT/EP2021/079320, International Search Report dated Feb. 18, 2022 (Two (2) pages).

(Continued)

*Primary Examiner* — Mathew Franklin Gordon
(74) *Attorney, Agent, or Firm* — Crowell & Moring LLP

(57) ABSTRACT

A method for dynamically restraining an occupant fastened into a vehicle seat with a seatbelt in a vehicle, where a transverse acceleration of the vehicle and a course of a road ahead of the vehicle are determined and the seatbelt is tightened with a predefined belt force a predefined length of time before the vehicle enters a bend that has a predefined curvature. The method includes assigning a respective comfort speed to different turning angles of turnoffs and turnings at which it is possible to comfortably drive into the turnoffs or around the turnings. When the vehicle nears a turnoff or a turning at a current driving speed that exceeds the comfort speed assigned to the turning angle by a predefined value, the seatbelt is tightened with a predefined belt force before the turnoff or the turning is reached.

8 Claims, 2 Drawing Sheets

(56) References Cited

FOREIGN PATENT DOCUMENTS

| | | |
|---|---|---|
| DE | 10 2008 050 317 A1 | 5/2010 |
| DE | 10 2009 033 689 A1 | 1/2011 |
| DE | 10 2009 056 990 A1 | 6/2011 |
| DE | 10 2010 053 352 A1 | 6/2012 |
| DE | 10 2011 009 466 A1 | 7/2012 |
| DE | 10 2018 002 559 A1 | 10/2019 |
| EP | 2 505 434 A2 | 1/2012 |
| GB | 2 442 502 A | 4/2008 |
| JP | 2001-10447 A | 1/2001 |
| JP | 2006-7834 A | 1/2006 |
| JP | 2006-224904 A | 8/2006 |
| JP | 2007-22392 A | 2/2007 |
| JP | 2010-195131 A | 9/2010 |
| JP | 2017-73072 A | 4/2017 |
| JP | 2020-69832 A | 5/2020 |
| JP | 2020-69835 A | 5/2020 |
| WO | WO 2019/003278 A1 | 1/2019 |

OTHER PUBLICATIONS

German-language German Office Action issued in German application No. 10 2020 006 623.2 dated Jun. 7, 2021 (Seven (7) pages).
Japanese-language Japanese Office Action issued in Japanese Application No. 2023-526294 dated Dec. 26, 2023 (4 pages).

METHOD FOR DYNAMICALLY RESTRAINING AN OCCUPANT FASTENED INTO A VEHICLE SEAT WITH A SEATBELT

BACKGROUND AND SUMMARY OF THE INVENTION

The invention relates to a method for dynamically restraining an occupant, fastened into a vehicle seat with a seatbelt, in a vehicle, wherein a transverse acceleration of the vehicle and a course of the road ahead of the vehicle are determined and the seatbelt is tightened with a predefined belt force a predefined length of time before the vehicle enters a bend that has a predefined curvature.

DE 10 2008 050 317 A1 describes a method for dynamically restraining a vehicle occupant fastened to a vehicle seat with a seatbelt, in which lateral dynamics of the vehicle are determined by means of a sensor, wherein a belt slack of the seatbelt is at least partially retracted by means of a belt retractor if an upper threshold of the lateral dynamics is exceeded.

A method and a device for dynamically restraining a vehicle occupant fastened to a seat of a vehicle with a seatbelt is known from DE 10 2008 050 316 A1. The method provides that lateral dynamics of the vehicle are determined by means of at least one sensor, wherein a belt slack of the seatbelt is at least partially retracted by means of a belt retractor if an upper threshold of the lateral dynamics is exceeded, and a bend radius of a course of the road ahead remains constant or reduces.

A vehicle seatbelt system having a reversible belt tightener that can apply a belt tightening force in several predetermined levels to a belt strap of a seatbelt is disclosed in DE 10 2009 033 689 A1. The vehicle seatbelt system further comprises a control unit for controlling the belt tightener and a device for recording a course of the road in front of the vehicle and for detecting bends ahead of the vehicle. The control unit causes the belt tightening force to be kept at an increased level if a further bend follows a bend that is just being driven around within a predetermined distance in the course of the road.

A method for driving dynamics adaptation of occupant restraining is known from DE 10 2009 056 990 A1, wherein the adaptation is achieved by activating at least one means for restraining an occupant and a point in time for the activation is determined by the method. Information about a future course of the road of a navigation system and current vehicle data are taken into account here. In a first step of the method, a course of the bend and a bend beginning of the course of the bend of a bend are first roughly determined using the road course data and a current vehicle position. In a second step, an exact beginning of the bend, and thus of the course of the bend, is determined more precisely by determining the exact bend beginning or a distance to the exact bend beginning via an image-evaluating camera system or via a beam measurement. The point in time for the activation of the occupant restraining is additionally made dependent on a duration that is required in advance until the vehicle position reaches the exact bend beginning.

DE 10 2010 053 352 A1 further describes a method for driving dynamics adaptation of an occupant restraining that is achieved by activating at least one means of occupant restraining, wherein a point in time for the activation is determined by the method with reference to current vehicle data. For this purpose, a beginning of the bend and a course of the bend are determined by determining the bend beginning or a distance to the bend beginning and the course of the bend via an image-evaluating camera system or via a beam measurement. The point in time for the activation of the occupant restraining is made dependent on a duration that is required in advance until the vehicle position reaches the exact bend beginning.

DE 10 2018 002 559 A1 additionally discloses a method for dynamically restraining an occupant fastened into a vehicle seat with a seatbelt, wherein a transverse acceleration of the vehicle and a course of the road ahead of the vehicle are determined. The seatbelt is tightened with a predefined belt force a predefined length of time before driving into a bend having a particular curvature.

A vehicle seatbelt device is known from US 2007/0102915 A1. This device comprises an electric motor for retracting a slack seatbelt portion of a seatbelt during an emergency in a vehicle and a control unit for controlling the electric motor. The control unit causes the electric motor to continuously rotate only in the retraction direction and to repeatedly switch between a rotation at a low speed and a rotation at a high speed if an emergency state of the vehicle is predicted. A belt tension is varied by repeatedly changing the rotational speed between a high and low speed, whereby the seatbelt vibrates. An occupant can be made aware of a predicted emergency via this vibration.

The object of the invention is to specify a method for dynamically restraining an occupant fastened into a vehicle seat with a seatbelt.

A method for dynamically restraining an occupant, fastened into a vehicle seat with a seatbelt, in a vehicle provides that a transverse acceleration of the vehicle and a course of the road ahead of the vehicle are determined and the seatbelt is tightened with a predefined belt force a predefined length of time before the vehicle enters a bend that has a predefined curvature. According to the invention, a comfort speed is respectively assigned to different turning angles of turnoffs and turnings, at which it is possible to comfortably drive into the turnoff or around the turning. If the vehicle nears a turnoff or a turning at a current driving speed that exceeds the comfort speed assigned to the turning angle by a predefined value, the seatbelt is tightened with a predefined belt force before the turnoff or the turning is reached.

As the seatbelt is tightened before driving into the turnoff or the turning, the occupant on the vehicle seat is made aware of the approaching cornering maneuver, wherein tightening the seatbelt can represent a haptic warning for the occupant before the turnoff or the turning in which an increased transverse acceleration acting on the occupant should be expected. The occupant, who is in particular the driver of the vehicle, thus has the opportunity to brake and thus to reduce a current driving speed of the vehicle, whereby a potentially present danger of an accident, e.g., when driving into the turnoff or the turning, can be at least substantially reduced.

The method serves for driver-adaptive restraining, whereby the occupant is restrained in the vehicle seat and thus a lateral displacement of the occupant in the vehicle seat in the direction of an outside of the turnoff or the turning is counteracted, in particular in the case of performance driving of the vehicle.

An embodiment provides that it is determined whether the vehicle intends to follow the turnoff or the turning using an activation of a direction indicator of the vehicle, and if the direction indicator is activated, the current driving speed is compared with the comfort speed assigned to the turning angle. It can thus be substantially avoided that the seatbelt is tightened for every turnoff or turning ahead of the vehicle although the occupant, and thus the driver, has no intention of turning off. Only when the direction indicator is activated corresponding to a direction of the turnoff or the turning is it assumed that the vehicle is going to turn off there.

A turnoff or turning ahead of the vehicle having a corresponding turning angle is determined using map data of a navigation system of the vehicle in a development of the method. The turning angle is in particular determined as no details of the curvature are usually stored in the map data in relation to turnings and turnoffs.

In a further embodiment of the method, a window of time until the turnoff or the turning is reached is predefined, within which it is required to activate the direction indicator in order to indicate that the vehicle will follow the turnoff or the turning.

The risk of triggering an implausible tightening of the seatbelt for the occupant is thus at least substantially reduced.

A further possible embodiment provides that, alternatively or in addition, a portion of the route until the turnoff or the turning is reached is predefined, within which it is required to activate the direction indicator in order to follow the turnoff or the turning. Here too, the risk of triggering an implausible tightening of the seatbelt for the occupant is thus at least substantially reduced.

In a possible development, the belt tightening only occurs if the vehicle is in a right lane when right-hand traffic is in force or in a left lane when left-hand traffic is in force on a roadway having several lanes running in one direction. It can thus be substantially prevented that a lane change in the region of a turnoff or turning leads to the seatbelt being tightened.

When the vehicle nears a roundabout, then it is provided in a further possible embodiment that a turning angle, in particular of an entrance into the roundabout, is determined and the seatbelt is tightened if the comfort speed is exceeded by the predefined value before entering the roundabout in order to warn the occupant about their current driving speed, which exceeds the assigned comfort speed, and to restrain the occupant in their vehicle seat.

As it is not usual to activate the direction indicator when entering a roundabout in some countries and regions, in a development, the turning angle is determined when nearing the roundabout if the direction indicator is not activated.

Exemplary embodiments of the invention are explained in more detail in the following with reference to the drawings.

DETAILED DESCRIPTION OF THE DRAWINGS

Figure 1:
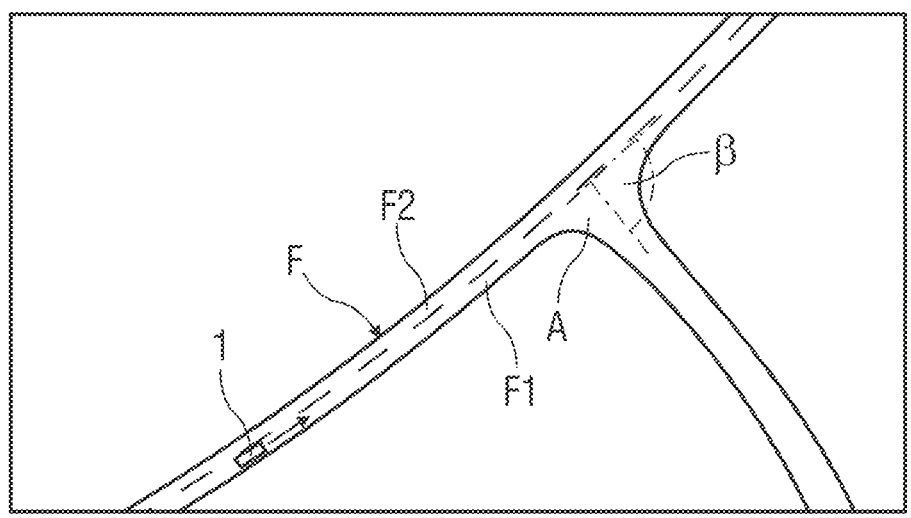
FIG. 1 schematically shows a roadway portion having a turning.

Parts corresponding to one another are provided with the same reference numerals in all figures.

FIG. 1 shows a roadway portion having two opposite lanes F1, F2, wherein a vehicle 1 is located on a right lane F1, the vehicle driving up to a crossing at which the vehicle 1 has the possibility to turn right. There are no further traffic participants in a left lane F2.

Different methods for dynamically restraining an occupant, fastened into a vehicle seat with a seatbelt, in a vehicle 1 are known from the prior art, wherein a transverse acceleration of the vehicle 1 and a course of the road ahead of the vehicle 1 are determined.

Information concerning a respective bend, such as in particular a curvature radius, is taken from map data of a navigation system of the vehicle 1 such that the seatbelt of the occupant is tightened with the predefined belt force a predefined duration before entering the bend that has a predefined curvature.

If the vehicle 1 is driving up to a turning A, a turnoff or a roundabout, as shown in FIG. 1 and in the following figures, no curvature data is available for the purpose of tightening the seatbelt when a predefined curvature is determined. In the following, the term turning A is also used in place of the terms turnoff and roundabout.

Thus, if the vehicle 1 drives up to the turning A, and intends to turn right at the turning, the seatbelt of the occupant is not tightened, regardless of the current driving speed at which the vehicle 1 enters the turning A.

A turning angle β is usually stored at such a turning instead of a curvature radius, the turning angle being able to be used to dynamically restrain the occupant by means of the seatbelt.

A method described below is provided to tighten the seatbelt in particular circumstances at a turning A, and thus at a turnoff or a roundabout.

A transverse acceleration acting on the vehicle 1, and thus on the occupant who is a driver of the vehicle 1, when driving into and around can be estimated using the turning angle β and a current driving speed of the vehicle 1.

This estimation can be achieved indirectly by respectively assigning a comfort speed v to different turning angles β of a turning A at which the turning A can still be comfortably driven around.

A connection between the turning angle β and the comfort speed v is clarified with reference to the following FIGS. 2 to 5.

Figure 2:
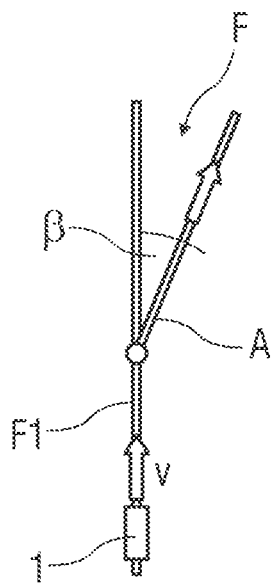
FIG. 2 schematically shows a roadway portion having a turning having a first turning angle.
Figure 3:
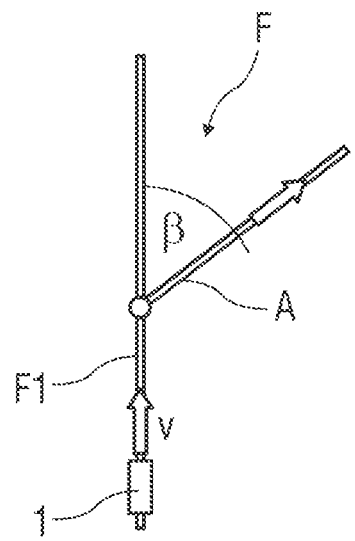
FIG. 3 schematically shows a roadway portion having a turning having a second turning angle.
Figure 4:
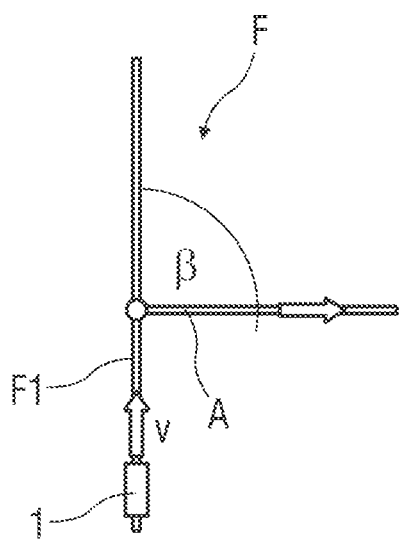
FIG. 4 schematically shows a roadway portion having a turning having a third turning angle.
Figure 5:
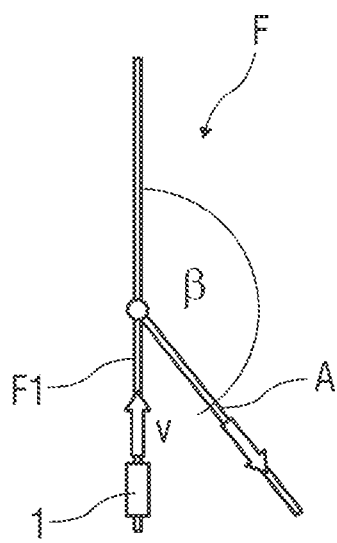
FIG. 5 schematically shows a roadway portion having a turning having a fourth turning angle.

If the vehicle 1 turns off at the turning A shown in FIG. 2, a transverse acceleration will hardly affect the vehicle 1, such that the comfort speed v can be comparatively high.

The transverse acceleration affecting the vehicle 1 is higher the more acute the turning A is and the larger the turning angle β is. The comfort speed v at which it is possible to drive around the respective turning A comfortably must correspondingly be smaller in FIG. 5 than in FIGS. 1 to 4.

The method for dynamically restraining the occupant by means of the seatbelt provides that the seatbelt is only tightened at a turning A if the vehicle 1 nears the turning A at a current driving speed that exceeds the comfort speed v assigned to the turning angle β by a predefined value, in particular if the current driving speed lies significantly above the comfort speed v assigned to the current turning angle of the turning A.

If the vehicle 1 nears the turning A at a current driving speed exceeding the comfort speed v by the predefined value, the seatbelt is tightened with a predefined belt force. The seatbelt is in particular tightened comparatively little, whereby in relation to the comparatively high current driving speed, the occupant is first warned and, at the turning itself, experiences an improved holding of their upper body.

In a possible embodiment of the method, the tightening of the seatbelt is triggered if the current driving speed exceeds the comfort speed v assigned to the turning angle β, e.g., by 75%. This percentage value can be parameterized and can be plausibly calibrated and adjusted during a development of the method.

Alternatively, it can also be possible to create custom assignments in relation to the speed thresholds dependent on the respective turning angle β at which the tightening of the seatbelt occurs.

In order to avoid as far as possible that the tightening of the seatbelt is triggered at any turning A that the vehicle 1 passes and the driver does not intend to turn off, information from direction indicators of the vehicle 1 is taken into account.

If the vehicle 1 nears a turning A and the direction indicator of the vehicle 1 is correspondingly activated, then it is assumed that the vehicle 1 is turning off at the next turning A, such that the current driving speed of the vehicle 1 is compared with the comfort speed v dependent on the turning angle β, and the tightening of the seatbelt is optionally triggered.

In order to be able to eliminate the possibility of an implausible tightening of the seatbelt of the occupant as far as possible, a window of time and/or a portion of road before the respective turning A is determined, i.e., if the direction indicator is activated within the predefined period of time or while the predefined portion of road is being driven through, it is assumed that the vehicle 1 intends to turn off. The possibility of accidental constant flashing, which can be seen as cause to compare the current driving speed with the corresponding comfort speed, can thus be substantially avoided.

If the vehicle 1 is on a roadway portion F having several lanes F1 running in one direction, then the tightening of the seatbelt is only triggered if the vehicle 1 is in a right lane F1 when right-hand traffic is in force and is in a left lane when left-hand traffic is in force.

It can thus be substantially avoided that when the vehicle 1 nears a turning A, for example at an exit, and thus a turnoff, and an activated direction indicator is recorded, the vehicle 1 turns off, but happens to perform a lane change level with the turning A.

If the vehicle 1 nears a roundabout as a turning A, then turning angle β is also factored into a decision to trigger the tightening of the seatbelt, and the current driving speed of the vehicle 1 is compared with the comfort speed v assigned to the turning angle of an entrance into the roundabout. If the current driving speed exceeds the comfort speed by the predefined value, then the tightening of the seatbelt is triggered before entering the roundabout and the seatbelt is tightened with the predefined belt force.

If it is determined using map data in the vehicle that the vehicle 1 is nearing a roundabout, it is not provided that the direction indicator must be activated to tighten the seatbelt in some instances.

LIST OF REFERENCE CHARACTERS

1 vehicle
A turning
F roadway portion
F1 right lane
F2 left lane
v comfort speed
β turning angle

The invention claimed is:

1. A method for dynamically restraining an occupant fastened into a vehicle seat with a seatbelt in a vehicle, wherein a transverse acceleration of the vehicle and a course of a road ahead of the vehicle are determined and the seatbelt is tightened with a predefined belt force a predefined length of time before the vehicle enters a bend that has a predefined curvature, comprising the steps of:
   assigning a respective comfort speed to different turning angles of turnoffs and turnings at which it is possible to comfortably drive into the turnoffs or around the turnings; and
   when the vehicle nears a turnoff or a turning at a current driving speed that exceeds the comfort speed assigned to the turning angle by a predefined value, the seatbelt is tightened with a predefined belt force before the turnoff or the turning is reached.

2. The method according to claim 1, further comprising the steps of:
   determining whether the vehicle intends to follow the turnoff or the turning by using an activation of a direction indicator of the vehicle; and
   when the direction indicator is activated, the current driving speed is compared with the comfort speed assigned to the turning angle.

3. The method according to claim 1, further comprising the step of determining a turnoff ahead of the vehicle or a turning ahead of the vehicle having a corresponding turning angle by using map data of a navigation system of the vehicle.

4. The method according to claim 3, wherein a window of time until the turnoff ahead of the vehicle or the turning ahead of the vehicle is reached is predefined, within which it is required to activate a direction indicator in order to follow the turnoff ahead of the vehicle or the turning ahead of the vehicle.

5. The method according to claim 3, wherein a portion of road until the turnoff ahead of the vehicle or the turning ahead of the vehicle is reached is predefined, within which it is required to activate a direction indicator in order to follow the turnoff ahead of the vehicle or the turning ahead of the vehicle.

6. The method according to claim 1, wherein the belt tightening only occurs when the vehicle is in a right lane when right-hand traffic is in force or in a left lane when left-hand traffic is in force on a roadway having several lanes running in one direction.

7. The method according to claim 1, wherein when the vehicle nears a roundabout, a respective turning angle is determined and the seatbelt is tightened when the respective comfort speed is exceeded by the predefined value before entering the roundabout.

8. The method according to claim 7, wherein the respective turning angle is determined when the vehicle nears the roundabout when a direction indicator is not activated.

* * * * *